US005744529A

United States Patent [19]
Butler et al.

[11] Patent Number: 5,744,529
[45] Date of Patent: Apr. 28, 1998

[54] CURABLE COMPOSITIONS

[75] Inventors: Derek William Butler, Barry South Glamorgan; Thomas Easton, South Glamorgan; Peter Cheshire Hupfield, Mid Glamorgan, all of Wales

[73] Assignee: Dow Corning Limited, Mid Glamorgan Wales, United Kingdom

[21] Appl. No.: 573,816

[22] Filed: Dec. 18, 1995

[30] Foreign Application Priority Data

Dec. 29, 1994 [GB] United Kingdom .................. 9426326

[51] Int. Cl.⁶ ............................................. C08K 5/54
[52] U.S. Cl. ............................. 524/265; 525/100
[58] Field of Search .......................... 525/100; 524/269

[56] References Cited

U.S. PATENT DOCUMENTS

| | | | |
|---|---|---|---|
| 4,146,511 | 3/1979 | Moriya et al. | 525/100 |
| 4,920,168 | 4/1990 | Nohr et al. | 524/168 |
| 5,248,783 | 9/1993 | O'Lenick | 548/110 |
| 5,296,625 | 3/1994 | O'Lenick, Jr. et al. | 556/437 |
| 5,514,731 | 5/1996 | Nakai | 523/122 |

FOREIGN PATENT DOCUMENTS

| | | | |
|---|---|---|---|
| 0499051 | 1/1992 | European Pat. Off. | C08G 77/46 |
| 05 132 557 A | 5/1993 | Japan. | |
| 05 210 883 A | 8/1993 | Japan. | |
| 05210883 | 8/1993 | Japan. | |
| 2218428 | 11/1989 | United Kingdom | C08G 77/04 |

OTHER PUBLICATIONS

Polym. Bull. 1988; vol. 20 (5) pp. 455-461. E. Wu et al. 'Comb polysiloxanes with w-hydroxyoligo(oxyethylene) side chains'.

Polym. Int. 1992 vol. 28(2) pp. 139-150. Kiraly and Vincent 'The synthesis and Characterisation of poly(ethylene-oxide) and b-poly(dimethylsiloxane) diblock polymer.'

Primary Examiner—Margaret W. Glass
Attorney, Agent, or Firm—Arne R. Jarnholm

[57] ABSTRACT

A curable composition comprises a polysiloxane additive having at least one unit $R_a SiO_{(4-a)/2}$ and at least one unit $R_b R^1 SiO_{(3-b)/2}$ wherein R is a $C_{1-12}$ hydrocarbon, $R^1$ is $-(CH_2)_n(OR^2)_m X$ where $R^2$ is $C_{2-3}$ alkylene, a is 0, 1, 2 or 3 and b is 0, 1 or 2, and X is OH or $-OCOCR^3=CH_2$ where $R^3$ is H, methyl or ethyl, n is 2 to 5 and m is 8 to 50, provided where X is OH, n is 3 and m is 18. The compositions are useful with polyacrylates as overprint varnishes with improved stability of friction coefficients. Also disclosed is a method for making the additives.

9 Claims, 2 Drawing Sheets

CURABLE COMPOSITIONS

This invention is concerned with curable compositions, more particularly compositions which cure upon exposure to UV radiation. The invention is particularly concerned with compositions comprising friction reducing additives. The invention also relates to a method for making said additives. Curable compositions are well known and have been described in many publications. They are used for a variety of applications, including sealants, protective coatings, encapsulants and printing. The present invention, though applicable to many types of curable compositions, is particularly concerned with protective coatings, more specifically varnishes, e.g. overprint varnishes. In the manufacture of packaging, e.g. boxes, or packaging material it is desirable to have low friction between slidable surfaces, e.g., between the surfaces of the various elements of a production line and packaging or packaging material. It is therefore desirable to impart to the surface of packaging material a degree of lubricity which will prevent sticking and abrasion damage. Accordingly, packaging material can be coated with certain coating compositions comprising additives based on silicone-alkylene oxide copolymers which, when cured, have a low coefficient of friction.

However, coating compositions containing the said additives tend to lack consistency of performance, that is, the coefficient of friction tends to fluctuate upward and/or downward as a function of time. This inconsistency in performance is believed to be a result of the additives, which are low viscosity liquids, migrating away from the surface of a cured coating composition. This causes problems to manufacturers who calibrate their machinery according to the frictional force between slidable surfaces. Additionally, the additives may migrate to an adhesive coated surface, e.g., an adhesive seal of a box, which may adversely affect the adhesive seal over a period of time. Friction reducing additives are known which display a reduced tendency to migrate within a coating composition to which they are applied. This is achieved by adding certain functionality to the friction reducing additives which enables an additive to react into the coating composition during cure. However, the processes of producing these friction reducing additives tend to involve relatively complex syntheses.

There remains a need to provide improved curable compositions which comprise friction reducing additives, which can be made through relatively uncomplicated synthetic routes, capable of imparting to cured compositions reduced coefficients of friction with consistent performance. We have now found that we can provide improved curable compositions by adding friction reducing additives, which may be reactive or unreactive, with the curable composition itself. The said additives may be produced by a relatively uncomplicated synthetic pathway.

According to the invention there is provided a curable composition comprising an additive which is a polysiloxane comprising at least one unit (i) $R_aSiO_{(4-a)/2}$ and at least one unit (ii) $R_bR^1SiO_{(3-b)/2}$ wherein R represents a monovalent hydrocarbon or substituted hydrocarbon group having from 1 to 12 carbon atoms, $R^1$ represents a group of the formula $-(CH_2)_n(OR^2)_mX$ where $R^2$ is an alkylene unit having 2 or 3 carbon atoms, X is selected from a hydroxyl group or the group to the formula $-OCOCR^3=CH_2$ where $R^3$ is a hydrogen, a methyl group or an ethyl group, a is 0, 1, 2 or 3 and b is 0, 1 or 2, n has a value of 2 to 5 and m has a value of from 8 to 50, provided that where X is a hydroxyl group, n is 3 and m is 18.

In the Derwent abstract of JP 05210883 is disclosed a protective film for photomagnetic discs comprising a curable composition and a polyethylene oxide-ethylene glycol modified silicone compound of the formula

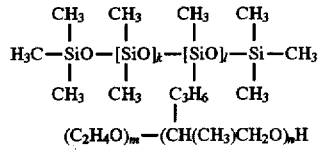

to prevent surface scratching by providing a coating with a low coefficient of friction. No details of the values of k, l, m or n are available in the abstract, but no indication is given that the particular values for m and n are important or should be as indicated for the polysiloxane to be used in the compositions according to the invention, nor is there any suggestion that improvements can be obtained by providing (meth)acrylic groups to such polysiloxane.

In another of its aspects, the invention provides the use of a polysiloxane comprising at least one unit (i) $R_aSiO_{(4-a)/2}$ and at least one unit (ii) $R_bR SiO_{(3-b)/2}$ wherein R represents a monovalent hydrocarbon or substituted hydrocarbon group having from 1 to 12 carbon atoms, $R^1$ represents a group of the formula $-(CH_2)_n(OR^2)_mX$ where $R^2$ is an alkylene unit having 2 or 3 carbon atoms, a is 0, 1, 2 or 3 and b is 0, 1 or 2, and X is selected from a hydroxyl group or the group to the formula $-OCOCR^3=CH_2$ where $R^3$ is a hydrogen atom, a methyl group or an ethyl group, n has a value of 2 to 5 and m has a value of from 8 to 50, provided that where X is a hydroxyl group, n is 3 and m is 18, as a friction reducing additive in curable compositions, particularly in UV curable coating compositions.

The polysiloxane comprised in the compositions according to the invention or used as a friction reducing additive according to the invention may be linear or branched or a mixture thereof. The polysiloxanes may be Low viscosity liquid materials but preferably are higher viscosity materials, even waxy solids or solid materials. These polysiloxanes are preferably materials which are waxy solids at a temperature of about 40° C.

It is preferred that the polysiloxanes have at least one unit according to formula (ii) wherein b has the value of 2, which means that at least one unit comprising a $R^1$ substituent is an end-blocking unit of the polysiloxane. More preferably the polysiloxanes are linear polyorganosiloxanes having for both terminal groups a siloxane group having one $R^1$ substituent of the formula $-(CH_2)_n(OR^2)_m-X$ connected to a silicon atom through a silicon-carbon linkage. Most preferably the polysiloxanes are linear materials consisting of siloxane units of the formula (i) for all parts of the chain, except for the end-blocking units which would be units of the formula (ii). Preferably R is an alkyl group, more preferably a lower alkyl group having up to 6 carbon atoms, most preferably a methyl group. Preferably X is not a hydroxyl group.

The weight proportion of the group $-(CH_2)_n(OR^2)_mX$ in the polysiloxanes used in the compositions according to the invention is preferably from 30% to 70%, more preferably 40% to 60%, most preferably about 50% by weight of the total weight of the polysiloxane. This will give a better friction reducing ability. The polyalkylene oxide moiety, $(OR^2)_m$, may be polyethylene oxide or polypropylene oxide or a copolymer of polyethylene and polypropylene oxide. Advantageously the polyalkylene oxide is a polyethylene oxide. Particularly preferred polysiloxanes for use in compositions according to the invention are polydiorganosiloxanes represented by the general formula (Z)

$(R^2O)_m(CH_2)_n$—$(R_2SiO)_pSiR_2$—$(CH_2)_n(OR^2)_m$—X  (Z)

wherein at least 80% of the groups R are methyl and, when X is $OCOCR^3=CH_2$, n is 3, m is 8 to 50 and p is; from 10 to 50, provided that the values of m and p are such that the alkylene oxide moiety does not constitute less than 30% and not more than 70% of the total weight of the polysiloxane. It is preferred that the value of p is from 20 to 30. Where X is a hydroxyl group, it is particularly preferred that n is 3, m is 18 and p is 22. Examples of suitable polydiorganosiloxanes having the formula (Z) include those polydiorganosiloxanes in which n is 3, m is 36 and p is 50 or n is 3, m is 8 and p is 12.

The invention provides in yet another of its aspects a process for the formation of the polysiloxane additive (A) as described above for use in compositions according to the invention, wherein X denotes a group —$OCOCR=CH_2$, said process comprising the steps of (I) reacting a polysiloxane (B) having units according to the formula (i) $R_aSiO_{(4-a)/2}$ and (iii) $R_bHSiO_{(3-b)/2}$, wherein R, a and b are as defined above, with an unsaturated hydroxy polyoxyalkylene $CH_2=CH_2R^4{}_q(OR^2)_mOH$ in the presence of a noble metal catalyst and (II) reacting the product thereof with a carboxylic acid anhydride according to the formula (iv)

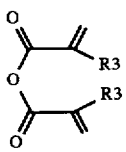

wherein $R^2$ is as defined above, $R^3$ is preferably methyl, $R^4$ is a divalent group —$(CH_2)$—, q is 0 or 1 and m is from 8 to 50.

Step (I) of a process according to the invention is a noble metal catalysed hydrosilylation reaction of a polysiloxane (B) with an unsaturated hydroxy polyoxyalkylene $CH_2=CHR^4{}_q$—$(OR^2)_mOH$, preferably $CH_2=CHR^4{}_q(OCH_2CH_2)_mOH$, for example $CH_2=CH(CH_2)_2(OCH_2CH_2)_{18}OH$, at a preferred temperature of about 50° to 150° C.

The polysiloxane (B) may be a polysiloxane having a structure which is linear or branched or a mixture of such structures may be used and has a molecular weight which is preferably from 900 to 4000 such that it has a viscosity of about 10 to 100 mm²/s at 25° C. A preferred polysiloxane (B) is a linear polyorganosiloxane, more preferably a polydimethylsiloxane comprising dimethylsilyl (—$Si(CH_3)_2H$) terminal groups.

The noble metal catalyst which is preferably a rhodium or platinum containing compound or complex, may be any active hydrosilylation catalyst, many of which are known in the art. A preferred catalyst is chloroplatinic acid in the form of the commonly available hexahydrate or in its anhydrous form. Platinum complexes may also be used, e.g. those materials prepared from chloroplatinic acid hexahydrate and divinyl tetramethyldisiloxane.

The product of the aforementioned hydrosilylation reaction step (I) is a polysiloxane similar to (A) described above, but wherein X is a hydroxyl group.

Step (II) of a process according to the invention involves the reaction of the resulting polysiloxane where X denotes a hydroxyl group with a carboxylic acid anhydride according to formula (iv).

The second step of the reaction is preferably conducted at a temperature of from 60° to 110° C., most preferably in a solvent which does not interfere with the desired course of reaction. Suitable solvents include toluene, xylene and cyclohexane. The polysiloxane resulting from step (I) may be isolated from the crude reaction mixture resultant from step (I) to be provided as a pure component, although no deleterious effect is observed to the course of reaction of step (II) if that polysiloxane is used directly, in its impure form, as part of the crude reaction mixture resultant from step (I).

The curable compositions comprising the friction reducing additive polysiloxanes hereinabove defined find utility as varnishes, for example overprint varnishes. It is accordingly preferred that the curable composition according to the invention is a curable coating composition, preferably an overprint varnish.

A curable coating composition according to the invention may comprise polyacrylated polymers known in the art. Preferred polyacrylated polymers include, polyester acrylates, epoxy acrylates and urethane acrylates. Curable coating compositions according to the invention may be cured by radiation, for example ultraviolet radiation or electron beam radiation. For those curable coating compositions curable by ultraviolet radiation the presence of a photoinitiator is desirable. Any of the known photoinitiators may be used, for example benzophenone, either alone or in conjunction with others, e.g. Davacur® 1173. The photoinitiator may be present in proportions of from 2 to 10 parts by weight per 100 parts of the total curable composition.

The skilled person will realise that a photo-activator can be used in combination with the aforementioned photoinitiator and that synergistic effects can be observed when said combinations are used. Photo-activators useful in a curable coating composition according to the invention are known in the art and include alkyl amines, e.g. methylamine, tributylamine and cyclohexylamine, however, we prefer to use an amine modified monoacrylated polyester. The photoactivator may also be present in the overprint varnish composition in proportions of from 2 to 10 parts by weight per 100 parts of the polyacrylated polymer.

Polysiloxanes for use in the curable compositions according to the invention may be present in amounts of from 0.1 to 3.0% by weight and preferably 0.2 to 1.0% by weight based on the total weight of composition, e.g. the overprint varnish. However, as the preferred polysiloxanes are waxy solid materials, which are not as easy to dispense and formulate into liquid systems, it is preferred that those polysiloxanes are provided in conjunction with a carrier material. Suitable carrier materials are manifold, but preferred ones include low molecular weight silicone polyethers such as polydiorganosiloxane polyoxyalkylene copolymers, particularly those with a short siloxane backbone (e.g. up to 6 silicon atoms) and an oxyalkylene content of from 30 to 50% by weight. Alternative carrier materials include reactive diluents for the overprint varnishes, e.g. those supplied by Arcos®. Other alternative carriers include solvents, e.g. toluene, xylene, isoparaffin, more preferably however, aprotic solvents, e.g. propylene carbonate and dipropylene glycol dimethyl ether.

Other adjuvants may be present in curable coating compositions according to the invention, for example dyes, wetting agents and other additives known in the art of coating compositions.

Cured coating compositions according to the invention exhibit a low coefficient of friction. Additionally, the cured coatings maintain a consistently low coefficient of friction over time. The consistency of performance is believed to be a result of the additive reacting into the coating composition, e.g. overprint varnish during cure and consequently being immobilised therein. This is particularly surprising where those polysiloxanes are used where X denotes a hydroxyl group, as one considers that polysiloxane to be an unreactive additive not possessing acrylate functionality.

When the friction reducing additive polysiloxanes are added as a component to the curable coating compositions according to the present invention in proportions of about 0.1% by weight based on the total weight of the overprint varnish, they have the additional surprising benefit that they increase the gloss finish of the coating composition. Significantly larger proportions of the friction reducing additive polysiloxanes, i.e. up to about 2% by weight does not detract from the gloss finish or the clarity of the cured coating composition, but it is preferred not to exceed the 2% addition level if gloss is to be maintained. Gloss is advantageous as a glossy, clear coat adds to the eye appeal of packaging and the like.

The curable coating compositions of this invention are particularly well suited to forming coatings on fibrous and cellulosic substrates or on plastics coated fibrous or cellulosic substrates, although they can also be applied to other substrates, e.g. metal. The curable coating compositions can be applied over substrates having conventional printing inks printed thereon and cured by exposure to radiation to provide a protective overprint for printed matter, e.g. publications, posters, packaging and the like. Curable coating compositions may be applied as thin coatings to suitable substrates by any of the known methods suitable for the application of such coatings, for example roll coating, gravure coating, doctor blade, spraying or brushing.

BRIEF DESCRIPTION OF THE DRAWINGS

There now follow a number of examples which illustrate the invention, and which need to be read in conjunction with the drawings, of which

EXAMPLE 1

176.8 g of an allyl end-blocked polyethylene glycol, 0.28 g of a platinum complex (sufficient to give $5 \times 10^{-5}$ moles Pt/mole SiH), and 300 g of toluene were charged to a flask fitted with a condenser, nitrogen inlet and thermometer. The mixture was heated to 90° C. before slowly adding over a period of 2 hours 169.8 g of a polydimethylsiloxane having a chainlength of 22 siloxane units end-blocked with dimethylsiloxy groups. The mixture was held at a temperature of 90° to 112° C. until all residual SiH was consumed, which was measured by regular sampling and infrared spectroscopy. The resultant reaction mixture was worked-up by removing the solvent under reduced pressure of 100 mBar at a maximum temperature of 135° C. The resultant product was allowed to cool to a temperature of 45° C. before being poured into a receiving flask. 340.3 g of product was obtained as an off-white waxy solid, of 98% purity. Analysis of the product showed it to have the average formula

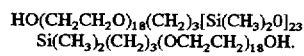

EXAMPLE 2

The procedure of Example 1 was followed up to, but not including, the work-up procedure. The reaction mixture of Example 1 was allowed to cool to 60° C. before adding 16.1 g of methacrylic acid anhydride slowly over a period of 5 minutes. The reaction mixture was then allowed to cool to 25° C. over a 2 hour period (this process was carried out in the absence of light although it could be carried out in an amber glass reactor). The resultant reaction mixture was worked-up in accordance with the procedure of Example 1. The product obtained was an off-white waxy solid at 25° C. Analysis of the product showed it to have the general formula

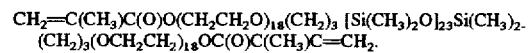

EXAMPLE 3

Illustrative Coating Composition 1

Figure 1:
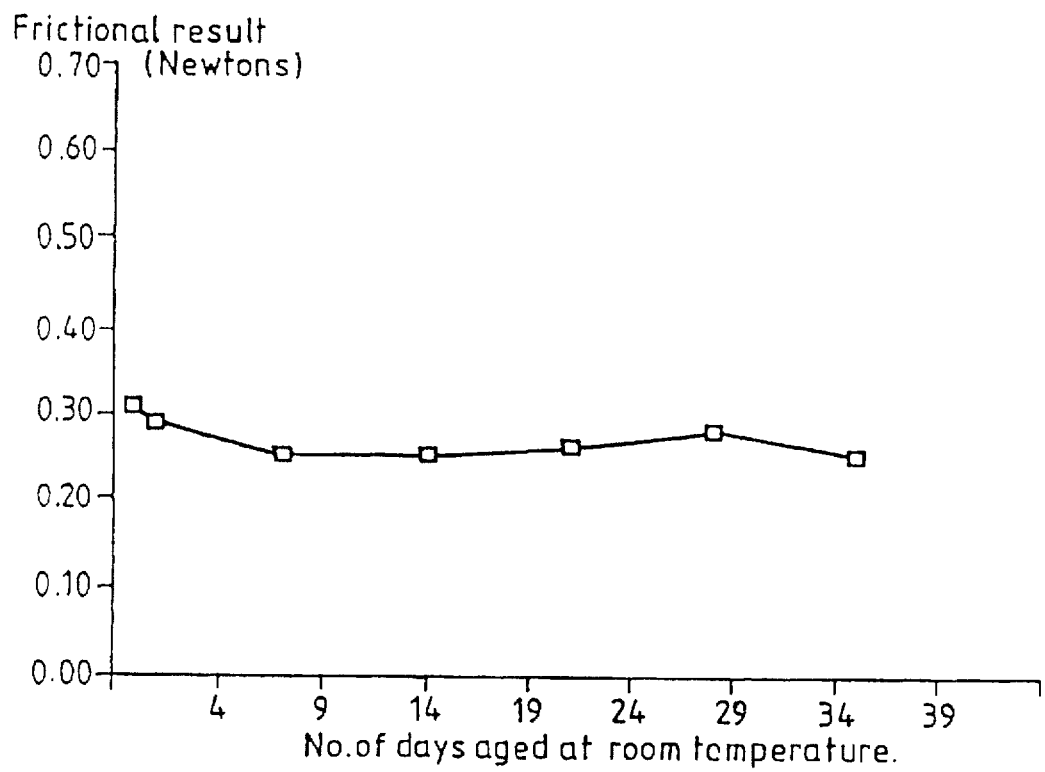
FIGS. 1 to 4 are graphs showing the evolution of the coefficient of friction from a number of compositions, as identified in the Examples, with time.

0.5 weight % of the siloxane polymer of Example 1 was added to 100 g of the model varnish composition (PHOTOMER®, supplied by Harcros Chemical group and comprising 83 parts of a tetra-functional acrylated polyester, 10 parts of an amine modified monofunctional acrylated ester, 5 parts of benzophenone and 2 parts of Davacur® 1173). The curable coating composition thus formed was coated onto paper substrate (Cham Tenero HiFi No.1, clay coated paper) by a Euclid® coating machine, to a coat weight of from 3 to 4 g/m². The coated paper was irradiated with a UV source by passing it under a medium power mercury lamp with an output of 300 W per square inch at a rate of 40 m/minute. The dynamic coefficient of friction of the cured coating was measured according to a modification of the DIN 53375 test method using a 200 g sledge. The results are shown in FIG. 1.

Illustrative Coating Composition 2

Figure 2:
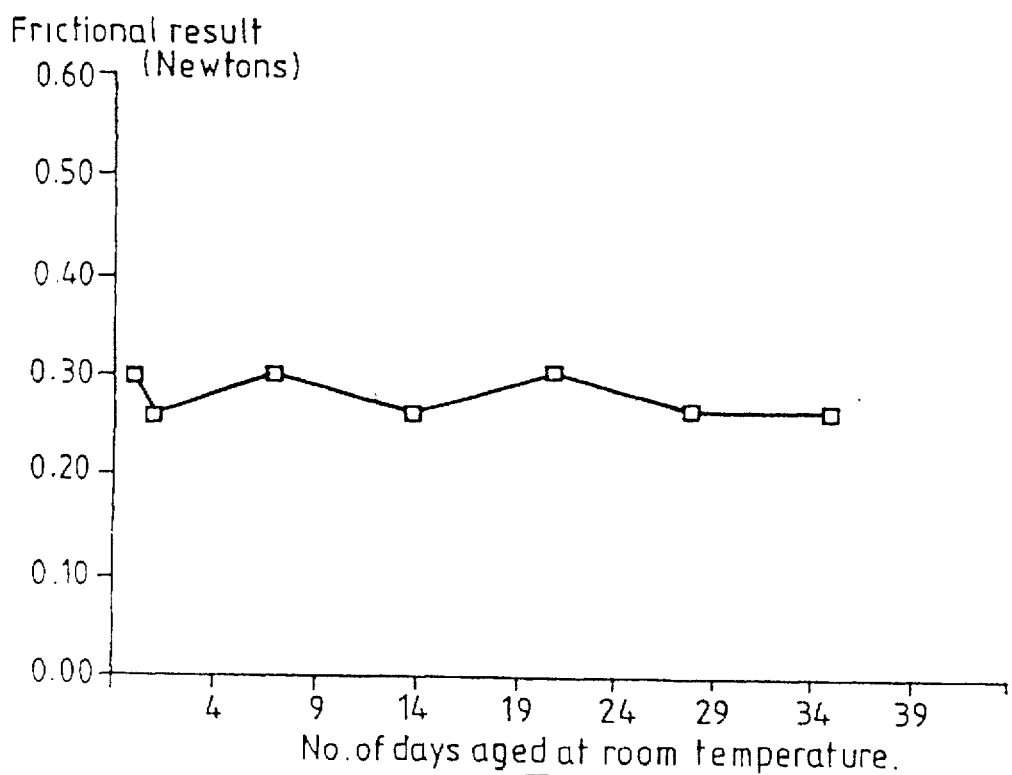

0.5 weight % of siloxane polymer of Example 2 was added to 100 g of the model varnish composition as described above. The resultant coating composition was coated onto paper and cured and tested according to the method described above. The coefficient of friction of the cured coating as a function of time is shown in FIG. 2.

Comparative Coating Composition 1

Figure 3:
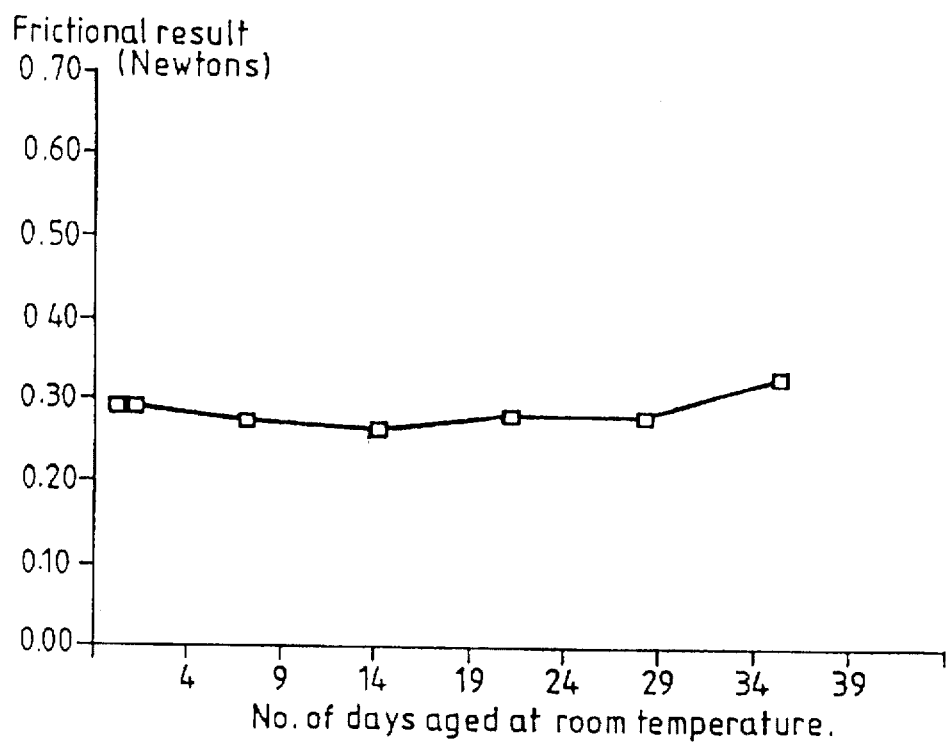

0.5 weight % of a friction reducing additive consisting of a liquid polysiloxane having the formula $R^5(Me_2SiO)_{19}SiMe_2R^5$, wherein Me is methyl and $R^5$ is the group —$(CH_2)_3(OE)_{19}(OP)_5OH$, wherein OE is a divalent ethylene oxide radical and OP is a divalent propylene oxide radical was added to 100 g of the model varnish composition. The resultant coating composition was coated onto paper and cured according to the method described above. The coefficient of friction of the cured coating as a function of time is shown in FIG. 3.

Comparative Coating Composition 2

Figure 4:
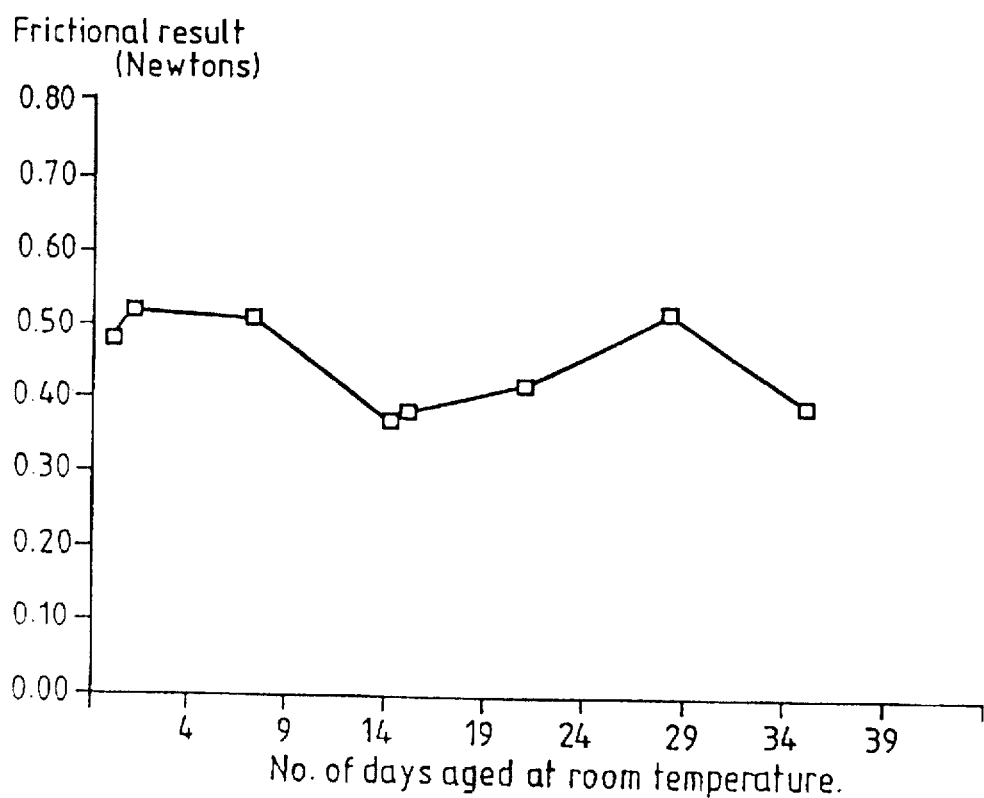

0.5 weight % of a friction reducing additive consisting of a liquid polysiloxane having the formula $R^6(Me_2SiO)_{14}SiMe_2R^6$, wherein $R^6$ represents the group —$(CH_2)_3(OE)_{12}OH$ was added to the model varnish composition. The resultant coating composition was coated onto paper, cured and tested according to the method described above. The coefficient of friction of the cured coating as a function of time is shown in FIG. 4. It can be seen that the comparative results give a greater variation of coefficient of friction than those according to the invention.

That which is claimed is:

1. A curable composition comprising
   (A) a polyacrylated polymer in combination with
   (B) an friction reducing additive which is a polysiloxane comprising at least one unit of the general formula (i) $R_aSiO_{(4-a)/2}$ and at least one unit of the general formula (ii) $R_bR^1SiO_{(3-b)/2}$ wherein R is selected from the group consisting of monovalent hydrocarbon groups having from 1 to 12 carbon atoms and substituted monovalent hydrocarbon groups having from 1 to 12 carbon atoms, $R^1$ represents a group of the formula —$(CH_2)_n(OR^2)_m$X wherein $R^2$ is an alkylene unit having 2 or 3 carbon atoms, a is 0, 1, 2 or 3 and b is 0, 1 or 2, X is selected from the group consisting of a hydroxyl group and a group having the formula —$OCOCR^3$=$CH_2$ where $R^3$ is selected from the group consisting of hydrogen, methyl and ethyl, n has a value of 2 to 5 and m has a value of from 8 to 50, provided that where X is a hydroxyl group, n is 3 and m is 18.

2. A curable composition according to claim 1 wherein said additive (B) has at least one unit (ii) wherein b has the value 2.

3. A curable composition according to claim 2 wherein the polysiloxane additive (B) is a linear polymer consisting essentially of:
at least one unit of the formula (i) wherein a has the value of 2;
and two units of the formula (ii) wherein b has the value of 2, the units (ii) being present as end-blocking units of the polysiloxane additive.

4. A curable composition according to claim 1 wherein the polysiloxane additive (B) is a waxy solid material at 40° C.

5. A curable composition according to claim 1 wherein the group —$(CH_2)_n(OR)_m$X in the polysiloxane additive (B) is present in a weight proportion of from 30% to 70% of the total weight of the polysiloxane.

6. A curable composition according to claim 1 wherein the polysiloxane additive is represented by the general formula

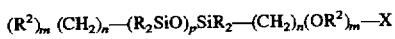

wherein R, $R^2$, X, m and n are as defined in claim 1, at least 80% of the groups R are methyl and p is from 10 to 50, with the proviso that the total weight of the —$(R^2O)_m$— alkylene oxide moieties constitutes from 30% to 70% of the total weight of the polysiloxane additive.

7. A curable composition according to claim 1 wherein the composition additionally comprises a carrier material selected from the group consisting of low molecular weight silicone polyethers, reactive diluents for overprint varnishes, solvents and aprotic solvents.

8. A curable composition according to claim 1 which is an overprint varnish composition wherein the polyacrylated polymer (A) is selected from the group consisting of polyester acrylate, epoxy acrylate and urethane acrylate.

9. A curable composition according to claim 8 wherein the polysiloxane additive (B) is present in an amount of from 0.1 to 3.0% by weight based on the total weight of the composition.

* * * * *